United States Patent [19]

Papenfuhs et al.

[11] 4,265,632

[45] May 5, 1981

[54] PROCESS FOR THE COLORATION OF THERMOPLASTIC POLYMERS AND POLYCONDENSATES IN THE MASS WITH WATER-INSOLUBLE DISAZOMETHINE COMPOUNDS

[75] Inventors: Theodor Papenfuhs, Frankfurt am Main; Wolfgang Teige, Kelkheim, both of Fed. Rep. of Germany

[73] Assignee: Hoechst Aktiengesellschaft, Fed. Rep. of Germany

[21] Appl. No.: 96,473

[22] Filed: Nov. 21, 1979

[51] Int. Cl.$^3$ .............................. D06P 3/52; C08J 5/00
[52] U.S. Cl. ............................................ 8/512; 8/489; 8/494; 8/637; 8/674; 8/922
[58] Field of Search .................... 8/4, 162 S, 512, 489, 8/494, 637, 674, 922

[56]  References Cited

U.S. PATENT DOCUMENTS 4,038,241  7/1977  Inman et al. .................... 260/39 P

FOREIGN PATENT DOCUMENTS 2611697  9/1977  Fed. Rep. of Germany .

Primary Examiner—A. Lionel Clingman
Attorney, Agent, or Firm—Connolly and Hutz

[57]  ABSTRACT

For coloring in the mass and spin dyeing water-insoluble thermoplastic polymers and polycondensates, especially polyesters, nickel complex disazomethine compounds are used having the general formula (1)

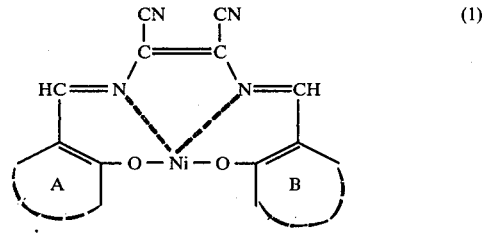

in which

A and B have the same meaning or are different from each other and each is an isocyclic or heterocyclic residue. The coloring compounds can be added to the polymeric material without previous dispersion. They are dissolved in said material in molecular disperse form so that generally brilliant and clear colorations are obtained. In spin dyeing the filaments substantially retain their high strength and drawing properties; abrasion and clogging of the nozzles or filters do not occur. The colorations are distinguished by a high color strength as well as by high fastnesses to light and to weather and by a good stability in thermofixation.

14 Claims, No Drawings

PROCESS FOR THE COLORATION OF THERMOPLASTIC POLYMERS AND POLYCONDENSATES IN THE MASS WITH WATER-INSOLUBLE DISAZOMETHINE COMPOUNDS

Coloration in the mass with pigments is described, for example, in the Review of Progress in Coloration, Volume 5 (1974), pages 86 to 94. It is known from this publication that shaped structures, such as fibers of synthetic polymers, can be colored during synthesis by adding pigments in the form of appropriate preparations. Fibers and filaments of polyesters, for example, have been spun-dyed for years according to the so-called condensation process in which a pigment/ethylene glycol dispersion is added to the ester interchange mixture, prior to or after the ester interchange of the starting material dimethyl terephthalate with ethylene glycol to obtain diglycol terephthalate while distilling off the methanol, or the dispersion is added to the reaction mixture prior to or during the polycondensation reaction of the starting components for the polyester material and the colored (pigmented) polymer is spun from the melt. This process is, however, disadvantageous in that the pigment used has to be dispersed in the form of sufficiently small particles about 2 μm in diameter and in that the condensation apparatus is soiled by the colored material, which necessitates a cleaning each time another pigment is to be used. Hence, this process is rather complicated and expensive. It is, therefore, used only for coloring the spinning mass with standard colors such as black, grey, navy blue and brown.

In practice, pigment concentrates (preparations) are also being used for spin dyeing synthetic polymers, such as polyesters and polyamides, which concentrates contain polyethylene waxes, polyesters and polyamides as carrier material.

The advantage of the latter process resides in the possibility rapidly to change the coloring component during the spinning of the polymer without an intermediate cleaning of the total apparatus being necessary, since it is only the spinning section of the apparatus that comes into contact with the pigment. The known processes of this type have, however, the disadvantage that in most cases the pigment distribution is insufficient in the preparations used, which are introduced into the polymer mass to be spun shortly before the spinning nozzle, so that the filters and spinning nozzles soon clog. Moreover, the addition of the preparation may reduce the strength of the colored polymer fibers. In order to avoid the difficulties resulting from pigment agglomerations in the spin dyeing of thermoplastic polymers, it is, therefore, necessary to use coloring components having a sufficient solubility in the molten and solidified polymer to be spun. Coloring components of this type are found, for example, in the series of vat dyes and disperse dyes, such as anthraquinone dyes. Their suitability has to be found out by spinning experiments in which they are tested especially for a sufficient thermostability (for example in the case of polyesters at 285° C. for 20 minutes), for their solubility in the polymer (above 2% by weight), for the tinctorial (coloristical) properties, and the spun-dyed materials themselves are tested as to their textile fastness properties (for example fastness to heat setting at 210° C. for 60 seconds).

It has now been found that compounds of the general formula (1)

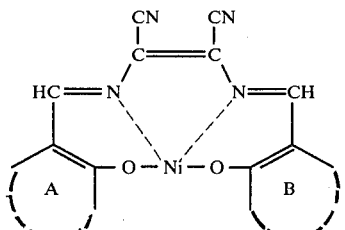

do not have the aforesaid disadvantages and are excellently suitable as coloring components, without previous dispersion, for coloring water-insoluble thermoplastic polymers and polycondensation products, preferably polyesters, in the mass.

In the above formula (1) A and B have the same meaning or are different from each other, preferably they have the same meaning, and each is an isocyclic or heterocyclic aromatic residue, for example a radical selected from the series of benzene, naphthalene, pyridine, pyrimidine, pyrazole, quinoline, isoquinoline, carbazole or cumarin, preferably the radical of benzene, naphthalene, pyridine, pyrimidine, pyrazole, quinoline, isoquinoline, carbazole or cumarin, which are unsubstituted or are substituted by substituents, preferably by 1, 2 or 3 substituents, selected from the group consisting of halogen (for example fluorine, chlorine, bromine), alkyl having from 1 to 4 carbon atoms (for example methyl, ethyl, propyl), alkoxy having from 1 to 4 carbon atoms (for example methoxy, ethoxy, propoxy and butoxy) acylamino of an alkanecarboxylic acid having from 2 to 6 carbon atoms, in particular from 2 to 4 carbon atoms (for example acetylamino or propionylamino), acylamino of a carbocyclic aromatic carboxylic acid (for example benzoylamino or benzoylamino substituted by lower alkoxy, lower alkyl, chlorine, bromine and/or nitro), cyano, carboxy, carbalkoxy having from 1 to 6 carbon atoms, in particular from 1 to 5 carbon atoms, in the alkyl moiety, carbamoyl, carbamoyl mono- or di-substituted at the nitrogen atom by alkyl having from 1 to 4 carbon atoms and/or by phenyl or phenyl substituted by 1 or 2 substituents selected from the group consisting of chlorine, methyl, ethyl, methoxy and ethoxy, hydroxy, nitro, phenyl and phenyl substituted by 1 or 2 substituents selected from the group consisting of methoxy, ethoxy, methyl, ethyl, chlorine, bromine, nitro, carboxy and acetylamino.

It is, therefore, the object of the present invention to use compounds of formula (1) as defined above for coloring in the mass water-insoluble thermoplastic polymers or polycondensates, preferably polyesters. It is another object of the invention to provide an improved process for coloring in the mass water-insoluble thermoplastic polymer or polycondensate by incorporating, advantageously dissolving a coloring compound into the mass of said matreial or into the reaction mass for preparing said material, as by a method such as generally used in practice, for example, by adding a coloring compound to the polymer or polycondensate or applying it thereon and incorporating it therein by melting, or by adding a coloring compound before or during the polymerization or polycondensation reaction for the manufacture of the water-insoluble thermoplastic polymer or polycondensate to the reaction mass and incorporating it therein, which improvement is characterized in that the coloring compound used is a compound of formula (1) as defined above which is dissolved in the polymer or polycondensate.

The term "coloring in the mass" in the sense of this invention also includes coloring of a mass for spin dyeing.

Preferably, the present invention relates to the use of the compounds of formula (1) for spin-dyeing, preferably of polyester fiber material,-respectively, it relates to a process for spin-dyeing a colored mass, especially a colored mass of polyester fiber material, wherein the coloring compound of the mass is a compound of formula (1).

The present invention also provides water-insoluble thermoplastic polymers and polycondensates colored in the mass and containing, dissolved therein, a compound of formula (1) as coloring component.

According to the invention those compounds of formula (1) are preferred in which A and B have the same meaning or are different from each other, preferably have the same meaning, and each is phenylene or naphthylene, each of which may be substituted by 1 or 2, substituents selected from the group consisting of methyl, ethyl, methoxy, ethoxy, hydroxy, bromine, chlorine, carboxy, acetylamino, propionylamino, benzoylamino, carbomethoxy, carboethoxy, carbamoyl, N-phenyl-carbamoyl and N-(methyl-phenyl)carbamoyl, or A and B eah is the radical of a hydroxyquinoline or of the 1-phenyl-3-methyl- or 1-phenyl-3-carboxy-pyrazole, the phenyl moiety of wich may be substituted by 1 or 2 substituents selected from the group consisting of carboxy, nitro, methyl, ethyl, methoxy, chlorine, bromine and acetylamino.

Further preferred compounds of formula (1) are those wherein A and B have the same meaning or are different from each other and each is phenylene or naphthylene, each of which may be substituted by methyl, methoxy, carboxy, acetylamino, carboethoxy, chlorine or bromine.

The compounds of the formula (1) may be prepared in the manner described in German Offenlegungsschrift No. 26 11 697.

Water-insoluble thermoplastic polymers or polycondensates that can be colored in accordance with the invention are, for example, polystyrene, polymethacrylate, polyamide, polyvinyl chloride free from plasticizer, and especially linear polyesters. Such polymers and polycondensates are known in a great number from literature.

Polyesters that can be colored in the mass according to the invention are, for example, linear polymers from aromatic dicarboxylic acids, such as terephthalic acid, with aliphatic dihydroxy compounds, such as ethylene glycol, 1,4-dihydroxy-butane and 1,4-dimethylol cyclohexane. Polymers of this type are polybutylene terephthalate, poly-(1,4-dimethylol cyclohexane-terephthalate), preferably, however, polyethylene glycol terephthalate, as well as poly-$\epsilon$-caprolactone.

The coloration in the mass is carried out in known manner. To produce light shades the undyed polymer or polycondensate in the form of granules or chips can be first mixed with a compound of formula (1) (so-called coating process), whereupon the mixture obtained is heated and melted so that the compound of formula (1) dissolves in the polymer or polycondensate. This generally known coating process can only be used, as usual, for producing masses dyed light shades since the small surface area of the granules or chips used does not make it possible to use higher concentrations of coloring component, otherwise demixing would occur and the coated granules would dust. Colorations not only of light shade but also of very deep shade can be produced by adding the coloring component, i.e. the compound of formula (1) in the form of a gritty or granular concentrate (preparation) to the polymer or polycondensate to be colored, for example in the form of granules or of a melt. Such preparations of coloring components, socalled master batches, consist of a compound of formula (1) and a suitable carrier material, the content of the compound of formula (1) possibly exceeding 50% by weight. Polymers suitable for coating or encapsulating the compound of formula (1) are the known thermoplastic carrier materials such a low molecular polyethylene, polypropylene, pulverulent polyamide or polyalkylene glycols, depending on the type of polymer or polycondensate to be colored. It is known, for example, that polyethylene and polyethylene waxes are little compatible only with polyesters and, hence, for coloring thermoplastic polyesters in the mass aliphatic polyesters having a melting point in the range of from about 60° to 120° C. are used as encapsulating polymer for the compound of formula (1). Polyesters of this type are, for example, poly-$\epsilon$-caprolactones having a molecular weight of from 1,000 to 50,000, linear aliphatic esters of linear aliphatic dicarboxylic acids having fron 6 to 12 carbon atoms with an aliphatic and/or cycloaliphatic glycol having from 2 to 6 carbon atoms, such as poly-(ethylene glycol adipate) and poly-(ethylene glycol sebacate), poly-(ethylene glycol decone-dicarboxylate) and poly-(cyclohexanediol adipate) having a molecular weight in the range of from 2,000 to 15,000. Encapsulation polymers of this type and processes for their manufacture are described in literature. The manufacture of dyestuff concentrates from a carrier material (encapsulation polymer) and the compound of formula (1) is likewise known from literature and can be carried out, for example, in a kneader by which the compound of formula (1) is encapsulated in the carrier material at a temperature at which the molten carrier has a sufficiently high viscosity, or by which the compound of formula (1) is dissolved in the carrier material if it is used with a low concentration. The master batches obtained in this manner do not dust and can be readily used for coloring polymers or polycondensates, preferably polyester, in the desired shades.

It is also possible according to the invention to color thermoplastic polymers and polycondensates in the mass with a compound of formula (1) during their manufacture by polymerization or polycondensation. To this end, the compound of formula (1) is added per se or in the form of a master batch as described above to the polymerization or polycondensation mixture prior to or during polymerization or polycondensation, in the case of the manufacture of polyesters preferably in the form of a dispersion in the starting glycol, for example ethylene glycol. During polymerization or polycondensation the compound of formula (1) dissolves in the polymer or polycondensate formed. This process is carried out in a manner analogous to known polymerization and polycondensation processes in which a coloring substance is added to the reaction mixture.

The polymers and polycondensates colored in the mass by one of the above process variants can then be shaped and processed in usual manner for example by injection molding or spinning, or they can be used for the manufacture of sheets and films. It proved especially advantageous to use the compound of formula (1) in the form of a concentrate (master batch), which is added to the molten polymer or polycondensate to be colored either per se or in molten form. In this manner, the compound of formula (1) can be easily dosed and the desired color shade and intensity can be adjusted in simple and exact manner.

The polymers or polycondensates to be colored may contain matting agents, for example titanium dioxide, or substances of this type may be added.

The compounds of formula (1) are added to the polymers and polycondensates in an amount necessary for obtaining the desired intensity of shade. In general, the coloration in the mass according to the invention is carried out with 0.05 to 3% by weight of the compound of formula (1), relative to the weight of the colored thermoplastic material.

Owing to the fact that the compounds of formula (1) dissolve in molecular disperse form in the molten as well as in the solid state in the polymers and polycondensates and especially in polyesters and are thus contained in the colored mass not in the form of solid particles, filaments spun therefrom have a practically unaffected high strength and good drawing properties. In the spinning process itself the nozzles or filters cannot clog and no abrasion occurs in the spinning nozzles. It is, therefore, not necessary to disperse separately the compounds of formula (1) prior to their use, and processing difficulties are excluded.

According to a special embodiment of the present invention the compounds of formula (1) are used for spin dyeing, i.e. a special embodiment of the invention is a process for spin dyeing a polymer or polycondensate, preferably polyesters, wherein a compound of formula (1) is used as a coloring component, for example a polyester polymer is colored in molten state with a compound of formula (1) and subsequently spun in usual manner. In analogy with known processes, for example when spinning on extrusion spinning machines, the compound of formula (1) is added in dosed quantities, preferably in the form of the aforesaid concentrate in the molten state, for example via a side screw, directly to the melt of the polymer or polycondensate to be spun, whereby a homogeneous mixing with dissolution of the compound of formula (1) is achieved. Alternatively, the mass can be spun on a grate spinning machine. It proved particularly advantageous to color the molten mass in spin dyeing by adding the aforesaid concentrate (master batch) of the compound of formula (1) in the molten state to the molten polymer or polycondensate directly before the spinning nozzle. It is thus especially advantageous to operate according to the injection process. In this manner soiling of the spinning equipment by the coloring substance can be avoided and the polymer or polycondensate to be spun can be dyed other or deeper shades either by changing the compound of formula (1) or the dose thereof.

The compounds of formula (1) yield intense, brilliant, red, violet to brown colorations which possess very good fastnesses to light and to rubbing and an excellent stability (fastness) to thermofixation. Surprisingly, the compounds of formula (1) have a high solubility of up to 3% by weight and thereabove in the water-insoluble thermoplastic polymers and polycondensates: this solubility exceeds the maximum concentration limits desired in practice. It should be particularly stressed that the compounds of formula (1) dissolved in the molten mass surprisingly have an outstanding thermostability which enables the colored mass to be processed even at temperatures of about 300° C. Hence, the compounds of formula (1) are excellently suitable for melt spinning. Moreover, they do not influence the viscosity of the spinning melt even in the case of intense coloration and do not impair the properties such as strength and elongation of the polymers or polycondensates or the shaped articles made therefrom, such as fibers and filaments. When using the compounds of formula (1) for the coloration in the mass, the colored material, especially in the form of thin structures such as fibers, filaments and films, meet the highest demands on color strength, fastness to light and to weather and even the otherwise critical stability to thermofixation. The high stability to thermofixation combined with the good polymer solubility of the compounds of formula (1) is especially surprising for the colored polymer and polycondensate masses.

The following examples illustrate the invention, the parts and percentages being by weight unless otherwise stated.

EXAMPLE 1

10 Parts of the compound of the formula

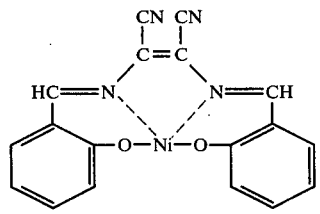

and 90 parts of ethylene glycol are made into a paste by stirring for 30 minutes with a rapid stirrer. 5 Parts of the paste obtained are blended with 95 parts of bis-(β-hydroxyethyl)-terephthalate, and the blend is heated for 6 hours to 270° to 280° C. in a high vacuum, whereby condensation to the polyester takes place. The colored melt obtained in this manner is cooled and granulated in usual manner.

The colored polyester mass can be processed into shaped articles of different types by the usual processes, for example by injection molding or melt spinning. Brilliant, deep, reddisch brown colorations having a very good stability to thermofixation and fastness to light are obtained especially in the manufacture of filaments.

EXAMPLES 2 TO 4

Instead of the disazomethine compound of Example 1 the following disazomethine compound corresponding to formula (1) is used,

| Ex. | A | B |
|---|---|---|
| 2 | | |
| 3 | | |

| Ex. | A | B |
|---|---|---|
| 4 | (2-methyl-4-methoxyphenyl) | (2-methyl-4-methoxyphenyl) | the other conditions being the same. Brown, intense colorations having very good fastness properties are likewise obtained.

EXAMPLE 5

1 Part of a compound of the following formula $$\text{[Ni complex of bis-disazomethine with CN, CN, HC=N, N=CH, O—Ni—O, COOH HOOC, naphthalene groups]}$$

is blended with 99 parts of granular poly-1,4-dimethylol cyclohexane terephthalate, and the blend is melted at 270° to 280° C. whereby a homogeneous solution of the disazomethine compound in the melt is formed. From the colored melt polyester, filaments having a brilliant red violet shade are spun by a conventional melt spinning process. The coloration is distinguished by a very good stability to thermofixation and fastness to light.

EXAMPLES 6 TO 8

The process is carried out under the conditions specified in Example 5 with the exception that instead of the disazomethine compound used in that Example a disazomethine compound of formula (1) as indicated in the following table is used.

| Ex. | A | B |
|---|---|---|
| 6 | 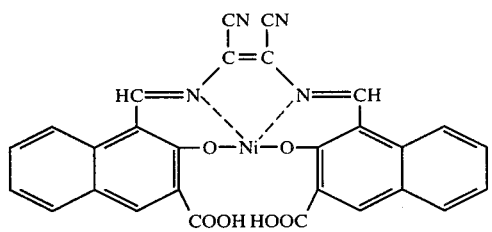 | |
| 7 | CH₃-pyrazole-N-phenyl | CH₃-pyrazole-N-phenyl |
| 8 | 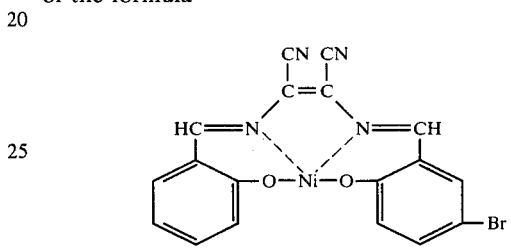 | |

The filaments obtained have a vivid brown hue with very good utilitarian and fastness properties.

EXAMPLE 9

2.5 Parts of a preparation of 40 parts of a compound of the formula $$\text{[Ni complex with CN, CN, HC=N, N=CH, O—Ni—O, Br substituent]}$$

and of 60 parts of an encapsulation polymer, for example a poly-ε-caprolactone, poly-(ethylene glycol adipate), poly-(ethylene glycol sebacate), poly-(ethylene glycol decane-dicarboxylate), poly-(cyclohexanediol adipate) or an isophthalic or a terephthalic acid copolyester with ethylene glycol and neopentyl glycol, are blended with 97.5 parts of poly-(ethylene glycol therephthalate), and filaments are spun from the melt by a process usual for polyester materials. The filaments obtained are distinguished by a brilliant, red violet shade having excellent fastness properties.

The preparation used can be made by mixing the coloring substance with the carrier material, melting the mixture, extruding it through a double screw extruder and granulating the extruded material.

EXAMPLES 10 TO 28

The process is carried out as described in any one of Examples 1, 5 and 9, with the exception that instead of the disazomethine compounds used in these examples one of the following disazomethine compounds of formula (1) is used. A colored polymer mass or colored filaments are obtained having the shades as indicated in the table and characterized by good utilitarian properties and fastness properties

| Ex. | A | B | Shade |
|---|---|---|---|
| 10 | CH₃O—(phenyl) | (phenyl)—OCH₃ | bordeaux red |
| 11 | " | (naphthyl) | violet |
| 12 | " | (phenyl) | violet |

-continued
| Ex. | A | B | Shade |
|---|---|---|---|
| 13 | 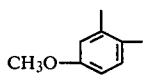 | 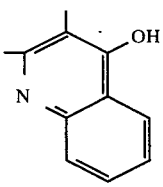 | blue violet |
| 14 |  |  | deep brown |
| 15 | " |  | red brown |
| 16 | " |  | brown violet |
| 17 | " |  | brown |
| 18 | " | 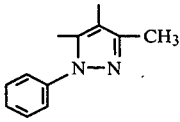 | blue violet |
| 19 |  |  | red violet |
| 20 | " |  | violet |
| 21 | " | 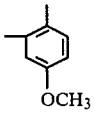 | red violet |
| 22 |  | 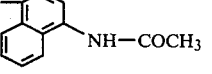 | red violet |
| 23 |  | 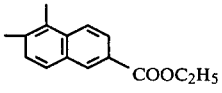 | dark red |
| 24 | " | 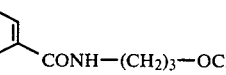 | dark red |
| 25 | " | 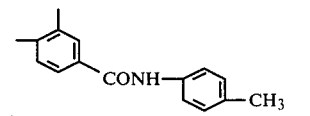 | red brown |
| 26 | 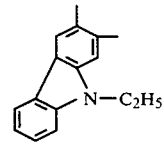 | 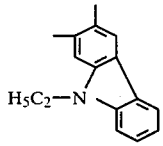 | dark blue |

| Ex. | A | B | Shade |
|---|---|---|---|
| 27 | (naphthalene with methyl and COOH) | (naphthalene with methyl) | bluish red |
| 28 | (naphthalene with methyl and COOH) | (benzene with methyl) | bluish red |

What is claimed is:

1. In a process for coloring a water-insoluble thermoplastic polymer or polycondensate in the mass which comprises incorporating, at least partially incorporating, a coloring compound into the mass of said material or into the reaction mass for preparing said material, the improvement which comprises incorporating, as the coloring compound, a disazomethine compound of the formula (1)

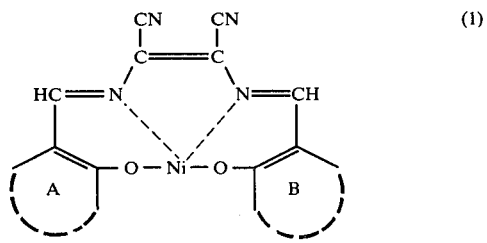

in which
A and B have the same meaning or are different from each other and each is an isocyclic or heterocyclic residue, and dissolving the coloring compound in that mass.

2. A process according to claim 1 wherein the compound of formula (1) is applied to the surface of the polymer or polycondensate and these components are melted together, or wherein the compound of formula (1) is added to a melt of the polymer or polycondensate, and dissolved therein.

3. A process according to claim 1 wherein the compound of formula (1) is added to a reaction mixture for the preparation of the polymer or polycondensate.

4. A process according to claim 1, wherein the disazomethine compound is a compound of formula (1) in which A and B have the same meaning or are different from each other and each is a benzene nucleus or a naphthalene nucleus, these nuclei being unsubstituted or substituted by one or two substituents selected from the group consisting of methyl, ethyl, methoxy, ethoxy, hydroxy, bromine, chlorine, carboxy, acetylamino, propionylamino, benzoylamino, carbomethoxy, carbethoxy, carbamoyl, N-phenyl-carbamoyl and N-(methylphenyl)-carbamoyl, or each is the hydroxychinoline radical or is the 1-phenyl-3-methyl- or the 1-phenyl-3-carboxy-pyrazol-residue, the phenyl of which may be unsubstituted or substituted by 1 or 2 substituents selected from the group of carboxy, nitro, methyl, ethyl, methoxy, ethoxy, chlorine, bromine or acetylamino.

5. A process according to claim 1, wherein the disazomethine compound is a compound of the formula

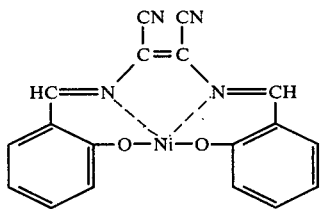

6. A process according to claim 1, wherein the disazomethine compound is a compound of the formula

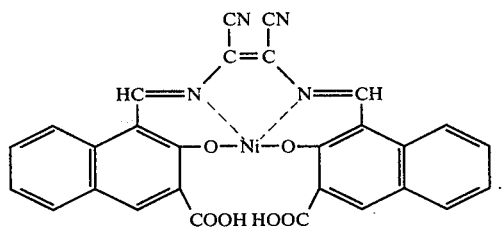

7. A process according to claim 1, wherein the disazomethine compound is a compound of the formula

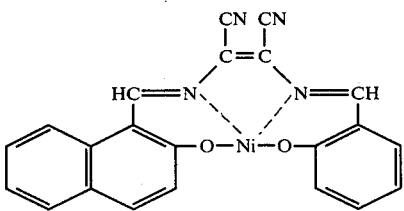

8. A process according to claim 1, wherein the disazomethine compound is a compound of the formula

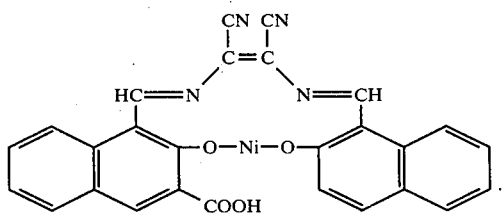

9. A process according to claim 1, wherein the disazomethine compound is a compound of the formula

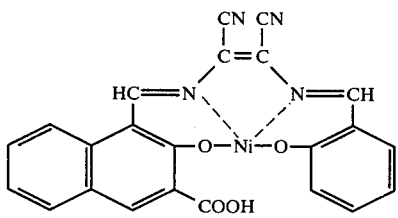

10. A process according to claim 1 wherein the disazomethine compound is a compound of formula (1) in which A and B have the same meaning or are different to each other and each is the benzene nucleus or the naphthalene nucleus, these nuclei being unsubstituted or substituted by methoxy, methyl, chlorine, bromine, acetylamino or carbethoxy or carboxy.

11. A water-insoluble polymer or polycondensate containing as coloring component a disazomethine compound of formula (1) definded in claim 1.

12. A process according to claim 1, wherein the polymer is a polyester.

13. A process according to claim 1, the process of coloration in the mass being a process for spin-dyeing.

14. A process according to claim 12 wherein the spin-dyeing is of polyester filaments.

* * * * *